United States Patent
Li et al.

(10) Patent No.: US 9,806,526 B2
(45) Date of Patent: Oct. 31, 2017

(54) BI-DIRECTIONAL DIRECT-CURRENT-TO-DIRECT-CURRENT CONVERTER, GRID-CONNECTED INVERTER SYSTEM, AND SOLAR ENERGY GRID-CONNECTED INVERTER SYSTEM

(71) Applicant: DELTA ELECTRONICS, INC., Taoyuan County (TW)

(72) Inventors: Chih-Chang Li, Taoyuan County (TW); Xin-Hung Lin, Taoyuan County (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 14/963,655

(22) Filed: Dec. 9, 2015

(65) Prior Publication Data

US 2017/0085170 A1   Mar. 23, 2017

(30) Foreign Application Priority Data

Sep. 22, 2015   (TW) ................. 10 4131254

(51) Int. Cl.
- *H02J 3/38* (2006.01)
- *H02M 3/158* (2006.01)
- *H02M 7/48* (2007.01)
- *H02M 1/00* (2006.01)

(52) U.S. Cl.
CPC ............ *H02J 3/38* (2013.01); *H02M 3/1582* (2013.01); *H02M 7/48* (2013.01); *H02M 2001/007* (2013.01); *H02M 2001/009* (2013.01)

(58) Field of Classification Search
CPC ........... H02M 3/04; H02M 7/44; H02M 7/487
See application file for complete search history.

(56) References Cited

U.S. PATENT DOCUMENTS

| | | | |
|---|---|---|---|
| 2004/0155526 A1* | 8/2004 | Naden | H02J 3/28 307/43 |
| 2010/0072819 A1* | 3/2010 | Lee | H02M 3/1582 307/77 |
| 2015/0103574 A1* | 4/2015 | Hintz | H02M 1/42 363/132 |

FOREIGN PATENT DOCUMENTS

| | | |
|---|---|---|
| JP | 2008295228 | 12/2008 |
| JP | 2015053770 | 3/2015 |

* cited by examiner

*Primary Examiner* — Jue Zhang
*Assistant Examiner* — Lakaisha Jackson
(74) *Attorney, Agent, or Firm* — Hauptman Ham, LLP

(57) ABSTRACT

A bi-directional direct current to direct current converter includes a first inductor, a first switch, a first capacitor, a middle voltage point, a second inductor, a second switch, a second capacitor, a third switch and a fourth switch. A direct current voltage supply unit provides the bi-directional direct current to direct current converter with an input direct current voltage. When the third switch is turned on, and the fourth switch is turned on, and the first switch is turned off, and the second switch is turned off, then the first inductor and the second inductor store energy. When the third switch is turned off, and the fourth switch is turned off, and the first switch is turned on, and the second switch is turned on, then the first inductor and the second inductor release energy to the first capacitor and the second capacitor.

13 Claims, 11 Drawing Sheets

US 9,806,526 B2

BI-DIRECTIONAL DIRECT-CURRENT-TO-DIRECT-CURRENT CONVERTER, GRID-CONNECTED INVERTER SYSTEM, AND SOLAR ENERGY GRID-CONNECTED INVERTER SYSTEM

BACKGROUND OF THE INVENTION

Field of the Invention

The present invention relates to a direct current to direct current converter and an inverter system, and especially relates to a bi-directional direct current to direct current converter and a grid-connected inverter system.

Description of the Related Art

FIG. 1 shows a block diagram of a related art grid-connected inverter system. A related art grid-connected inverter system 70 comprises a direct current voltage supply unit Vin, a bi-directional direct current to direct current converter 10, an inverter 20, a power grid 50 and a relay 60. The direct current voltage supply unit Vin comprises a voltage positive side VinP and a voltage negative side VinN. The bi-directional direct current to direct current converter 10 comprises a first inductor 102, a first switch 104, a first capacitor 106, a middle voltage point BusN, a second switch 110, a second capacitor 112 and a switch controller 118.

The direct current voltage supply unit Vin provides the bi-directional direct current to direct current converter 10 with an input direct current voltage 32. When the second switch 110 is turned on and the first switch 104 is turned off, the first inductor 102 stores energy. When the second switch 110 is turned off and the first switch 104 is turned on, the first inductor 102 releases energy to the first capacitor 106 and the second capacitor 112.

In another word, the switch controller 118 turns on or turns off the first switch 104 and the second switch 110, so that the bi-directional direct current to direct current converter 10 converts the input direct current voltage 32 into an output direct current voltage 34. The bi-directional direct current to direct current converter 10 sends the output direct current voltage 34 to the inverter 20. Moreover, the bi-directional direct current to direct current converter 10 sends the output direct current voltage 34 to the inverter 20 through the first capacitor 106 and the second capacitor 112.

For the inverter 20, the middle voltage point BusN is not connected to ground, but the electric potential of the middle voltage point BusN is controlled to be equal to ground. As shown in FIG. 1, in the boost architecture of the related art grid-connected inverter system 70, the voltage of the voltage negative side VinN relative to ground is |Vbus/2|, and the voltage of the voltage positive side VinP relative to ground is |the input direct current voltage 32−(Vbus/2)|, wherein the Vbus is the voltage difference between a first point p and a second point q in FIG. 1. Therefore, if the city power is AC200V, the Vbus is at least greater than the city power 350V. At this time, the voltage of the voltage negative side VinN relative to ground is 175V.

In conclusion, the voltage of the boost architecture relative to ground shown in FIG. 1 is related to the Vbus. However, some countries have laws and regulations for the input apparatus of the non-solar panel. For example, the input voltage relative to ground has to be less than 150V in the section 1300 of JEAC8001-2011 of Japan.

FIG. 2 shows a voltage simulation diagram of the related art grid-connected inverter system. As shown in FIG. 2, when the city power is AC200V, the voltage of the voltage negative side VinN relative to ground is 175V. Because the voltage of the boost architecture relative to ground shown in FIG. 1 is related to the Vbus, the voltage of the voltage negative side VinN relative to ground is not in conformity with the laws and regulations of Japan mentioned above. Therefore, an extra isolation apparatus has to be arranged to be in conformity with the laws and regulations of Japan mentioned above. The cost is increased.

SUMMARY OF THE INVENTION

In order to solve the above-mentioned problems, a first object of the present invention is to provide a bi-directional direct current to direct current converter.

In order to solve the above-mentioned problems, a second object of the present invention is to provide a bi-directional direct current to direct current converter.

In order to solve the above-mentioned problems, a third object of the present invention is to provide a grid-connected inverter system.

In order to solve the above-mentioned problems, a fourth object of the present invention is to provide a grid-connected inverter system.

In order to achieve the first object of the present invention mentioned above, the bi-directional direct current to direct current converter is applied to a direct current voltage supply unit and an inverter. The direct current voltage supply unit comprises a voltage positive side and a voltage negative side. The bi-directional direct current to direct current converter includes a first inductor, a first switch, a first capacitor, a middle voltage point, a second inductor, a second switch, a second capacitor, a third switch and a fourth switch. One side of the first inductor is electrically connected to the voltage positive side. A first side of the first switch is electrically connected to the other side of the first inductor. A second side of the first switch is electrically connected to the inverter. One side of the first capacitor is electrically connected to the second side of the first switch and the inverter. The middle voltage point is electrically connected to the other side of the first capacitor. One side of the second inductor is electrically connected to the voltage negative side. A first side of the second switch is electrically connected to the other side of the second inductor. A second side of the second switch is electrically connected to the inverter. One side of the second capacitor is electrically connected to the middle voltage point. The other side of the second capacitor is electrically connected to the second side of the second switch and the inverter. A first side of the third switch is electrically connected to the other side of the first inductor and the first side of the first switch. A second side of the third switch is electrically connected to the middle voltage point. A first side of the fourth switch is electrically connected to the middle voltage point. A second side of the fourth switch is electrically connected to the other side of the second inductor and the first side of the second switch. The direct current voltage supply unit provides the bi-directional direct current to direct current converter with an input direct current voltage. When the third switch is turned on, and when the fourth switch is turned on, and when the first switch is turned off, and when the second switch is turned off, then the first inductor and the second inductor store energy. When the third switch is turned off, and when the fourth switch is turned off, and when the first switch is turned on, and when the second switch is turned on, then the first inductor and the second inductor release energy to the first capacitor and the second capacitor.

Moreover, the bi-directional direct current to direct current converter mentioned above further comprises a switch controller electrically connected to a third side of the first switch, a third side of the second switch, a third side of the third switch and a third side of the fourth switch. The switch controller turns on or turns off the first switch, the second switch, the third switch and the fourth switch.

In order to achieve the second object of the present invention mentioned above, the bi-directional direct current to direct current converter is applied to a direct current voltage supply unit and an inverter. The direct current voltage supply unit comprises a voltage positive side and a voltage negative side. The bi-directional direct current to direct current converter includes a first inductor, a first switch, a first capacitor, a middle voltage point, a second inductor, a second switch, a second capacitor and a third switch. One side of the first inductor is electrically connected to the voltage positive side. A first side of the first switch is electrically connected to the other side of the first inductor. A second side of the first switch is electrically connected to the inverter. One side of the first capacitor is electrically connected to the second side of the first switch and the inverter. The middle voltage point is electrically connected to the other side of the first capacitor. One side of the second inductor is electrically connected to the voltage negative side. A first side of the second switch is electrically connected to the other side of the second inductor. A second side of the second switch is electrically connected to the inverter. One side of the second capacitor is electrically connected to the middle voltage point. The other side of the second capacitor is electrically connected to the second side of the second switch and the inverter. A first side of the third switch is electrically connected to the other side of the first inductor and the first side of the first switch. A second side of the third switch is electrically connected to the other side of the second inductor and the first side of the second switch. The direct current voltage supply unit provides the bi-directional direct current to direct current converter with an input direct current voltage. When the third switch is turned on, and when the first switch is turned off, and when the second switch is turned off, then the first inductor and the second inductor store energy. When the third switch is turned off, and when the first switch is turned on, and when the second switch is turned on, then the first inductor and the second inductor release energy to the first capacitor and the second capacitor.

Moreover, the bi-directional direct current to direct current converter further comprises a switch controller electrically connected to a third side of the first switch, a third side of the second switch and a third side of the third switch. The switch controller turns on or turns off the first switch, the second switch and the third switch.

In order to achieve the third object of the present invention mentioned above, the grid-connected inverter system comprises a direct current voltage supply unit, a bi-directional direct current to direct current converter, an inverter and a power grid. The direct current voltage supply unit comprises a voltage positive side and a voltage negative side. The bi-directional direct current to direct current converter is electrically connected to the direct current voltage supply unit. The inverter is electrically connected to the bi-directional direct current to direct current converter. The power grid is electrically connected to the inverter. The bi-directional direct current to direct current converter includes a first inductor, a first switch, a first capacitor, a middle voltage point, a second inductor, a second switch, a second capacitor, a third switch and a fourth switch. One side of the first inductor is electrically connected to the voltage positive side. A first side of the first switch is electrically connected to the other side of the first inductor. A second side of the first switch is electrically connected to the inverter. One side of the first capacitor is electrically connected to the second side of the first switch and the inverter. The middle voltage point is electrically connected to the other side of the first capacitor. One side of the second inductor is electrically connected to the voltage negative side. A first side of the second switch is electrically connected to the other side of the second inductor. A second side of the second switch is electrically connected to the inverter. One side of the second capacitor is electrically connected to the middle voltage point. The other side of the second capacitor is electrically connected to the second side of the second switch and the inverter. A first side of the third switch is electrically connected to the other side of the first inductor and the first side of the first switch. A second side of the third switch is electrically connected to the middle voltage point. A first side of the fourth switch is electrically connected to the middle voltage point. A second side of the fourth switch is electrically connected to the other side of the second inductor and the first side of the second switch. The direct current voltage supply unit provides the bi-directional direct current to direct current converter with an input direct current voltage. When the third switch is turned on, and when the fourth switch is turned on, and when the first switch is turned off, and when the second switch is turned off, then the first inductor and the second inductor store energy. When the third switch is turned off, and when the fourth switch is turned off, and when the first switch is turned on, and when the second switch is turned on, then the first inductor and the second inductor release energy to the first capacitor and the second capacitor.

Moreover, the bi-directional direct current to direct current converter further comprises a switch controller electrically connected to a third side of the first switch, a third side of the second switch, a third side of the third switch and a third side of the fourth switch. The switch controller turns on or turns off the first switch, the second switch, the third switch and the fourth switch.

Moreover, the grid-connected inverter system further comprises a relay electrically connected to the inverter and the power grid.

In order to achieve the fourth object of the present invention mentioned above, the grid-connected inverter system comprises a direct current voltage supply unit, a bi-directional direct current to direct current converter, an inverter and a power grid. The direct current voltage supply unit comprises a voltage positive side and a voltage negative side. The bi-directional direct current to direct current converter is electrically connected to the direct current voltage supply unit. The inverter is electrically connected to the bi-directional direct current to direct current converter. The power grid is electrically connected to the inverter. The bi-directional direct current to direct current converter includes a first inductor, a first switch, a first capacitor, a middle voltage point, a second inductor, a second switch, a second capacitor and a third switch. One side of the first inductor is electrically connected to the voltage positive side. A first side of the first switch is electrically connected to the other side of the first inductor. A second side of the first switch is electrically connected to the inverter. One side of the first capacitor is electrically connected to the second side of the first switch and the inverter. The middle voltage point is electrically connected to the other side of the first capacitor. One side of the second inductor is electrically connected to the voltage negative side. A first side of the second switch is electrically connected to the other side of the second inductor. A second side of the second switch is electrically connected to the inverter. One side of the second capacitor is electrically connected to the middle voltage point. The other side of the second capacitor is electrically connected to the second side of the second switch and the inverter. A first side of the third switch is electrically connected to the other side of the first inductor and the first side of the first switch. A second side of the third switch is electrically connected to the other side of the second inductor and the first side of the second switch. The direct current voltage supply unit provides the bi-directional direct current to direct current converter with an input direct current voltage. When the third switch is turned on, and when the first switch is turned off, and when the second switch is turned off, then the first inductor and the second inductor store energy. When the third switch is turned off, and when the first switch is turned on, and when the second switch is turned on, then the first inductor and the second inductor release energy to the first capacitor and the second capacitor.

Moreover, the bi-directional direct current to direct current converter further comprises a switch controller electrically connected to a third side of the first switch, a third side of the second switch and a third side of the third switch. The switch controller turns on or turns off the first switch, the second switch and the third switch.

Moreover, the grid-connected inverter system further comprises a relay electrically connected to the inverter and the power grid.

The advantage of the present invention is to reduce the voltage of the voltage negative side of the direct current voltage supply unit relative to ground. No extra isolation apparatus has to be arranged to be in conformity with the laws and regulations.

DETAILED DESCRIPTION OF THE INVENTION

Please refer to following detailed description and figures for the technical content of the present invention. The following detailed description and figures are referred for the present invention, but the present invention is not limited to it.

Figure 3:
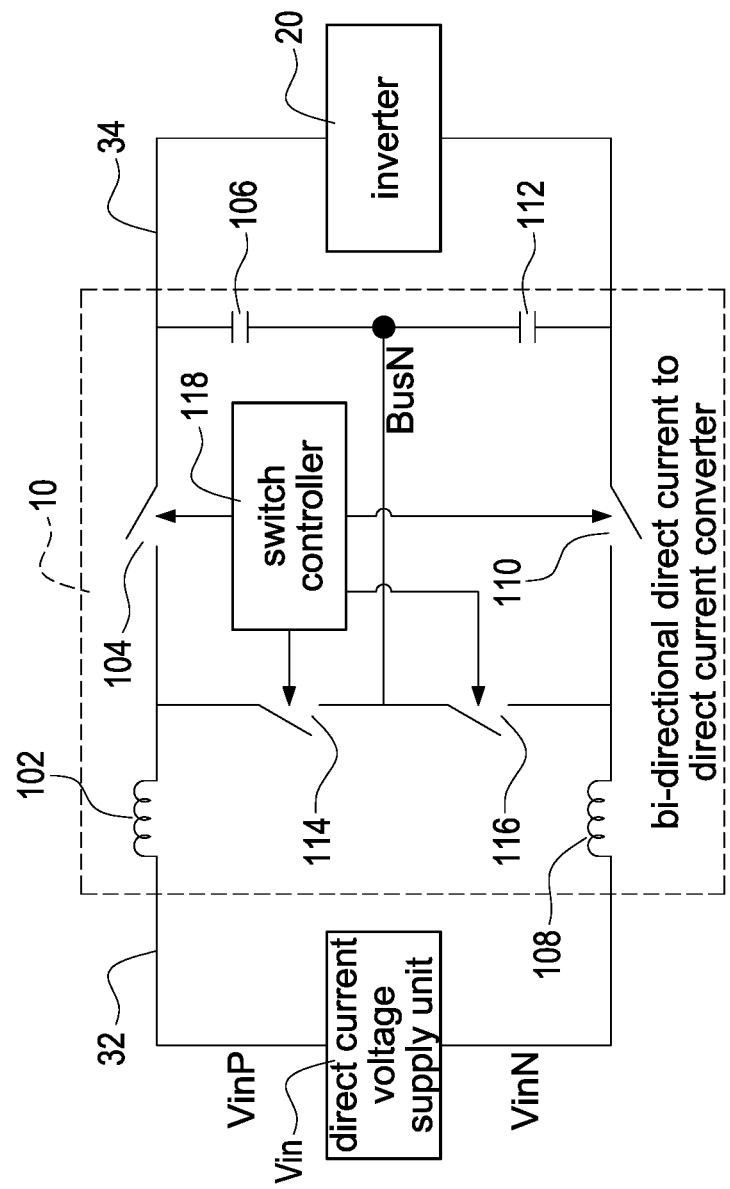
FIG. 3 shows a block diagram of the first embodiment of the bi-directional direct current to direct current converter of the present invention.

FIG. 3 shows a block diagram of the first embodiment of the bi-directional direct current to direct current converter of the present invention. A bi-directional direct current to direct current converter 10 is applied to a direct current voltage supply unit Vin and an inverter 20. The direct current voltage supply unit Vin comprises a voltage positive side VinP and a voltage negative side VinN. The bi-directional direct current to direct current converter 10 includes a first inductor 102, a first switch 104, a first capacitor 106, a middle voltage point BusN, a second inductor 108, a second switch 110, a second capacitor 112, a third switch 114, a fourth switch 116 and a switch controller 118. Besides providing power, the direct current voltage supply unit Vin can receive and store energy as well, and is, for example, a rechargeable battery.

One side of the first inductor 102 is electrically connected to the voltage positive side VinP. A first side of the first switch 104 is electrically connected to the other side of the first inductor 102. A second side of the first switch 104 is electrically connected to the inverter 20. One side of the first capacitor 106 is electrically connected to the second side of the first switch 104 and the inverter 20. The middle voltage point BusN is electrically connected to the other side of the first capacitor 106. One side of the second inductor 108 is electrically connected to the voltage negative side VinN. A first side of the second switch 110 is electrically connected to the other side of the second inductor 108. A second side of the second switch 110 is electrically connected to the inverter 20. One side of the second capacitor 112 is electrically connected to the middle voltage point BusN. The other side of the second capacitor 112 is electrically connected to the second side of the second switch 110 and the inverter 20. A first side of the third switch 114 is electrically connected to the other side of the first inductor 102 and the first side of the first switch 104. A second side of the third switch 114 is electrically connected to the middle voltage point BusN. A first side of the fourth switch 116 is electrically connected to the middle voltage point BusN. A second side of the fourth switch 116 is electrically connected to the other side of the second inductor 108 and the first side of the second switch 110. The switch controller 118 is electrically connected to a third side of the first switch 104, a third side of the second switch 110, a third side of the third switch 114 and a third side of the fourth switch 116.

The direct current voltage supply unit Vin provides the bi-directional direct current to direct current converter 10 with an input direct current voltage 32. In an embodiment, when the third switch 114 is turned on, and when the fourth switch 116 is turned on, and when the first switch 104 is turned off, and when the second switch 110 is turned off, then the first inductor 102 and the second inductor 108 store energy. When the third switch 114 is turned off, and when the fourth switch 116 is turned off, and when the first switch 104 is turned on, and when the second switch 110 is turned on, then the first inductor 102 and the second inductor 108 release energy to the first capacitor 106 and the second capacitor 112.

The embodiment mentioned above is just an example and the present invention is not limited to it. The present invention can further comprise other embodiments. By controlling the conduction sequence or the conduction time of the first switch 104, the second switch 110, the third switch 114 and the fourth switch 116, the voltage balance of the first capacitor 106 and the second capacitor 112 can be controlled.

In another word, the switch controller 118 turns on or turns off the first switch 104, the second switch 110, the third switch 114 and the fourth switch 116, so that the bi-directional direct current to direct current converter 10 converts the input direct current voltage 32 into an output direct current voltage 34. The bi-directional direct current to direct current converter 10 sends the output direct current voltage 34 to the inverter 20. Moreover, the bi-directional direct current to direct current converter 10 sends the output direct current voltage 34 to the inverter 20 through the first capacitor 106 and the second capacitor 112.

Figure 4:
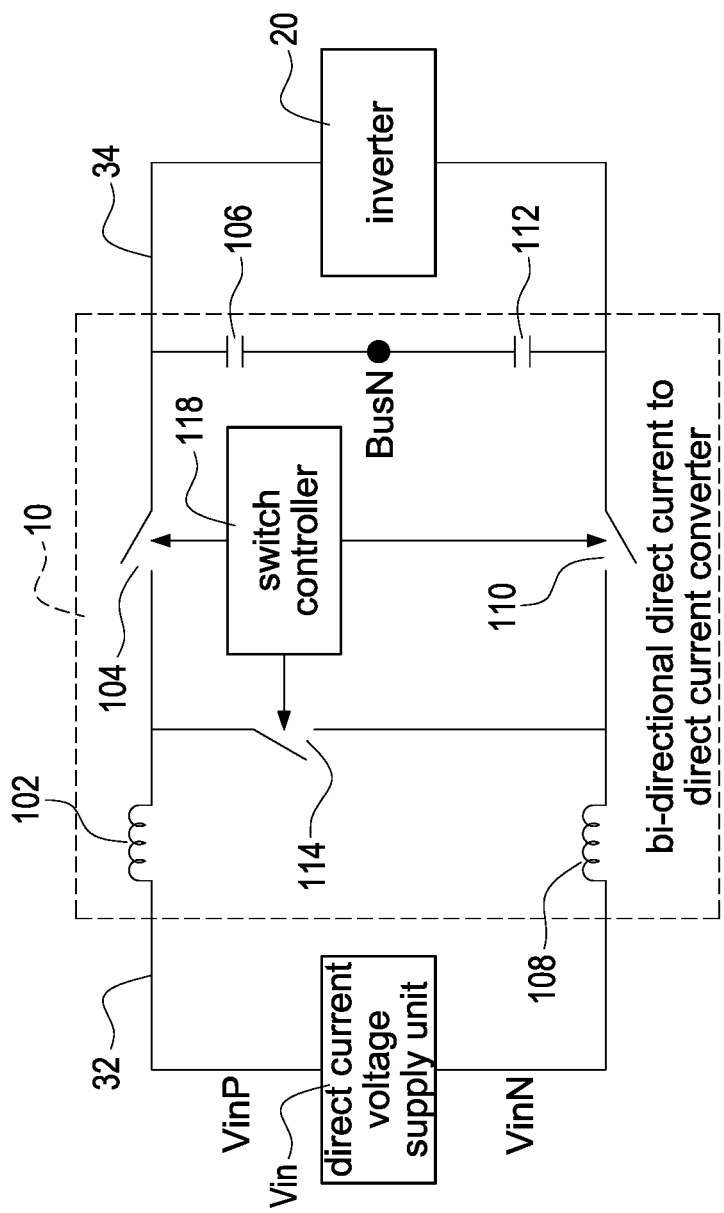
FIG. 4 shows a block diagram of the second embodiment of the bi-directional direct current to direct current converter of the present invention.

FIG. 4 shows a block diagram of the second embodiment of the bi-directional direct current to direct current converter of the present invention. A bi-directional direct current to direct current converter 10 is applied to a direct current voltage supply unit Vin and an inverter 20. The direct current voltage supply unit Vin comprises a voltage positive side VinP and a voltage negative side VinN. The bi-directional direct current to direct current converter 10 includes a first inductor 102, a first switch 104, a first capacitor 106, a middle voltage point BusN, a second inductor 108, a second switch 110, a second capacitor 112, a third switch 114 and a switch controller 118.

One side of the first inductor 102 is electrically connected to the voltage positive side VinP. A first side of the first switch 104 is electrically connected to the other side of the first inductor 102. A second side of the first switch 104 is electrically connected to the inverter 20. One side of the first capacitor 106 is electrically connected to the second side of the first switch 104 and the inverter 20. The middle voltage point BusN is electrically connected to the other side of the first capacitor 106. One side of the second inductor 108 is electrically connected to the voltage negative side VinN. A first side of the second switch 110 is electrically connected to the other side of the second inductor 108. A second side of the second switch 110 is electrically connected to the inverter 20. One side of the second capacitor 112 is electrically connected to the middle voltage point BusN. The other side of the second capacitor 112 is electrically connected to the second side of the second switch 110 and the inverter 20. A first side of the third switch 114 is electrically connected to the other side of the first inductor 102 and the first side of the first switch 104. A second side of the third switch 114 is electrically connected to the other side of the second inductor 108 and the first side of the second switch 110. The switch controller 118 is electrically connected to a third side of the first switch 104, a third side of the second switch 110 and a third side of the third switch 114.

The direct current voltage supply unit Vin provides the bi-directional direct current to direct current converter 10 with an input direct current voltage 32. When the third switch 114 is turned on, and when the first switch 104 is turned off, and when the second switch 110 is turned off, then the first inductor 102 and the second inductor 108 store energy. When the third switch 114 is turned off, and when the first switch 104 is turned on, and when the second switch 110 is turned on, then the first inductor 102 and the second inductor 108 release energy to the first capacitor 106 and the second capacitor 112.

In another word, the switch controller 118 turns on or turns off the first switch 104, the second switch 110 and the third switch 114, so that the bi-directional direct current to direct current converter 10 converts the input direct current voltage 32 into an output direct current voltage 34. The bi-directional direct current to direct current converter 10 sends the output direct current voltage 34 to the inverter 20. Moreover, the bi-directional direct current to direct current converter 10 sends the output direct current voltage 34 to the inverter 20 through the first capacitor 106 and the second capacitor 112.

Figure 5:
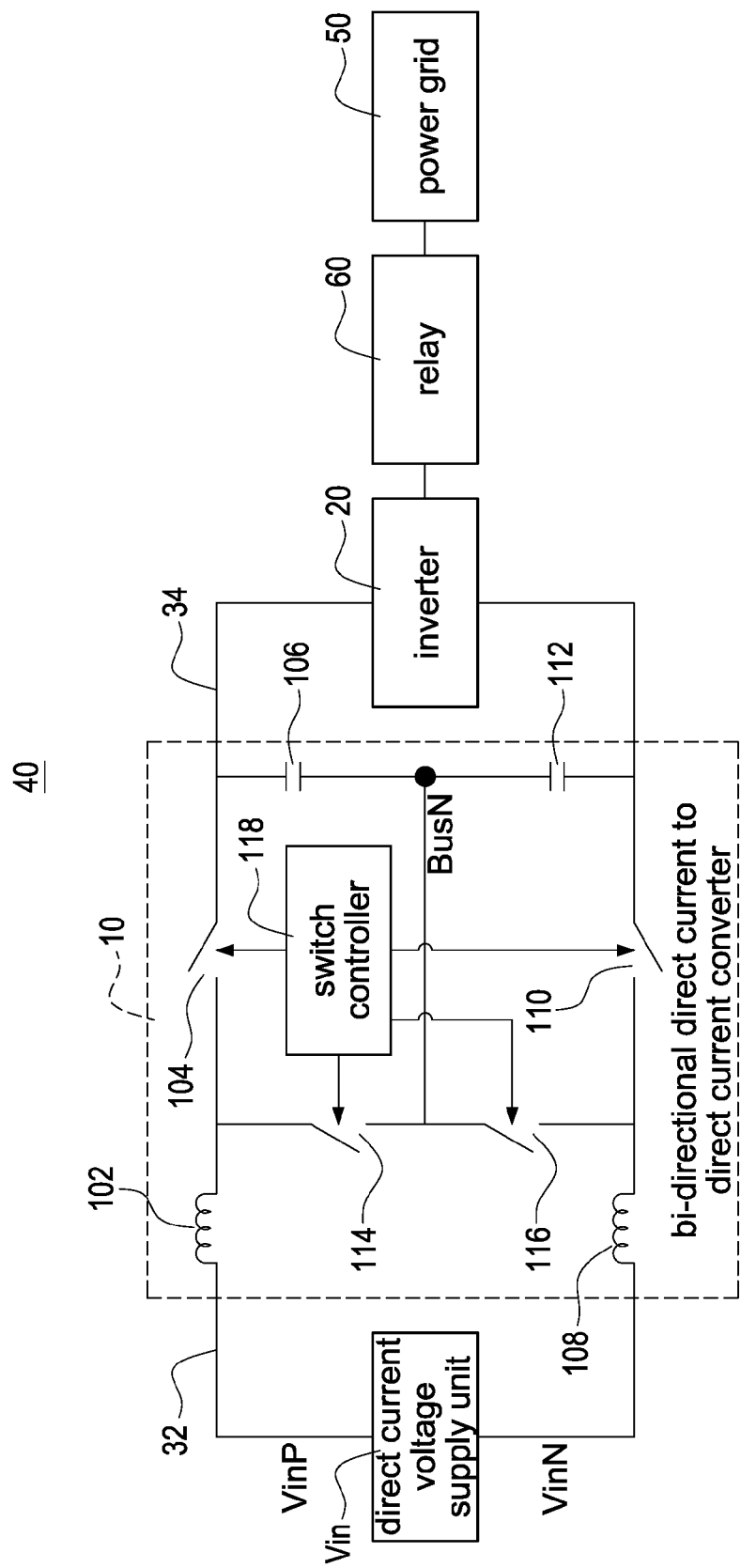
FIG. 5 shows a block diagram of the first embodiment of the grid-connected inverter system of the present invention.

FIG. 5 shows a block diagram of the first embodiment of the grid-connected inverter system of the present invention. A grid-connected inverter system 40 comprises a direct current voltage supply unit Vin, a bi-directional direct current to direct current converter 10, an inverter 20, a power grid 50 and a relay 60. The direct current voltage supply unit Vin comprises a voltage positive side VinP and a voltage negative side VinN. The bi-directional direct current to direct current converter 10 is electrically connected to the direct current voltage supply unit Vin. The inverter 20 is electrically connected to the bi-directional direct current to direct current converter 10. The power grid 50 is electrically connected to the inverter 20. The relay 60 is electrically connected to the inverter 20 and the power grid 50.

The bi-directional direct current to direct current converter 10 includes a first inductor 102, a first switch 104, a first capacitor 106, a middle voltage point BusN, a second inductor 108, a second switch 110, a second capacitor 112, a third switch 114, a fourth switch 116 and a switch controller 118.

One side of the first inductor 102 is electrically connected to the voltage positive side VinP. A first side of the first switch 104 is electrically connected to the other side of the first inductor 102. A second side of the first switch 104 is electrically connected to the inverter 20. One side of the first capacitor 106 is electrically connected to the second side of the first switch 104 and the inverter 20. The middle voltage point BusN is electrically connected to the other side of the first capacitor 106. One side of the second inductor 108 is electrically connected to the voltage negative side VinN. A first side of the second switch 110 is electrically connected to the other side of the second inductor 108. A second side of the second switch 110 is electrically connected to the inverter 20. One side of the second capacitor 112 is electrically connected to the middle voltage point BusN. The other side of the second capacitor 112 is electrically connected to the second side of the second switch 110 and the inverter 20. A first side of the third switch 114 is electrically connected to the other side of the first inductor 102 and the first side of the first switch 104. A second side of the third switch 114 is electrically connected to the middle voltage point BusN. A first side of the fourth switch 116 is electrically connected to the middle voltage point BusN. A second side of the fourth switch 116 is electrically connected to the other side of the second inductor 108 and the first side of the second switch 110. The switch controller 118 is electrically connected to a third side of the first switch 104, a third side of the second switch 110, a third side of the third switch 114 and a third side of the fourth switch 116.

The direct current voltage supply unit Vin provides the bi-directional direct current to direct current converter 10 with an input direct current voltage 32. In an embodiment, when the third switch 114 is turned on, and when the fourth switch 116 is turned on, and when the first switch 104 is turned off, and when the second switch 110 is turned off, then the first inductor 102 and the second inductor 108 store energy. When the third switch 114 is turned off, and when the fourth switch 116 is turned off, and when the first switch 104 is turned on, and when the second switch 110 is turned on, then the first inductor 102 and the second inductor 108 release energy to the first capacitor 106 and the second capacitor 112.

The embodiment mentioned above is just an example and the present invention is not limited to it. The present invention can further comprise other embodiments. By controlling the conduction sequence or the conduction time of the first switch 104, the second switch 110, the third switch 114 and the fourth switch 116, the voltage balance of the first capacitor 106 and the second capacitor 112 can be controlled.

In another word, the switch controller 118 turns on or turns off the first switch 104, the second switch 110, the third switch 114 and the fourth switch 116, so that the bi-directional direct current to direct current converter 10 converts the input direct current voltage 32 into an output direct current voltage 34. The bi-directional direct current to direct current converter 10 sends the output direct current voltage 34 to the inverter 20. Moreover, the bi-directional direct current to direct current converter 10 sends the output direct current voltage 34 to the inverter 20 through the first capacitor 106 and the second capacitor 112.

Figure 6:
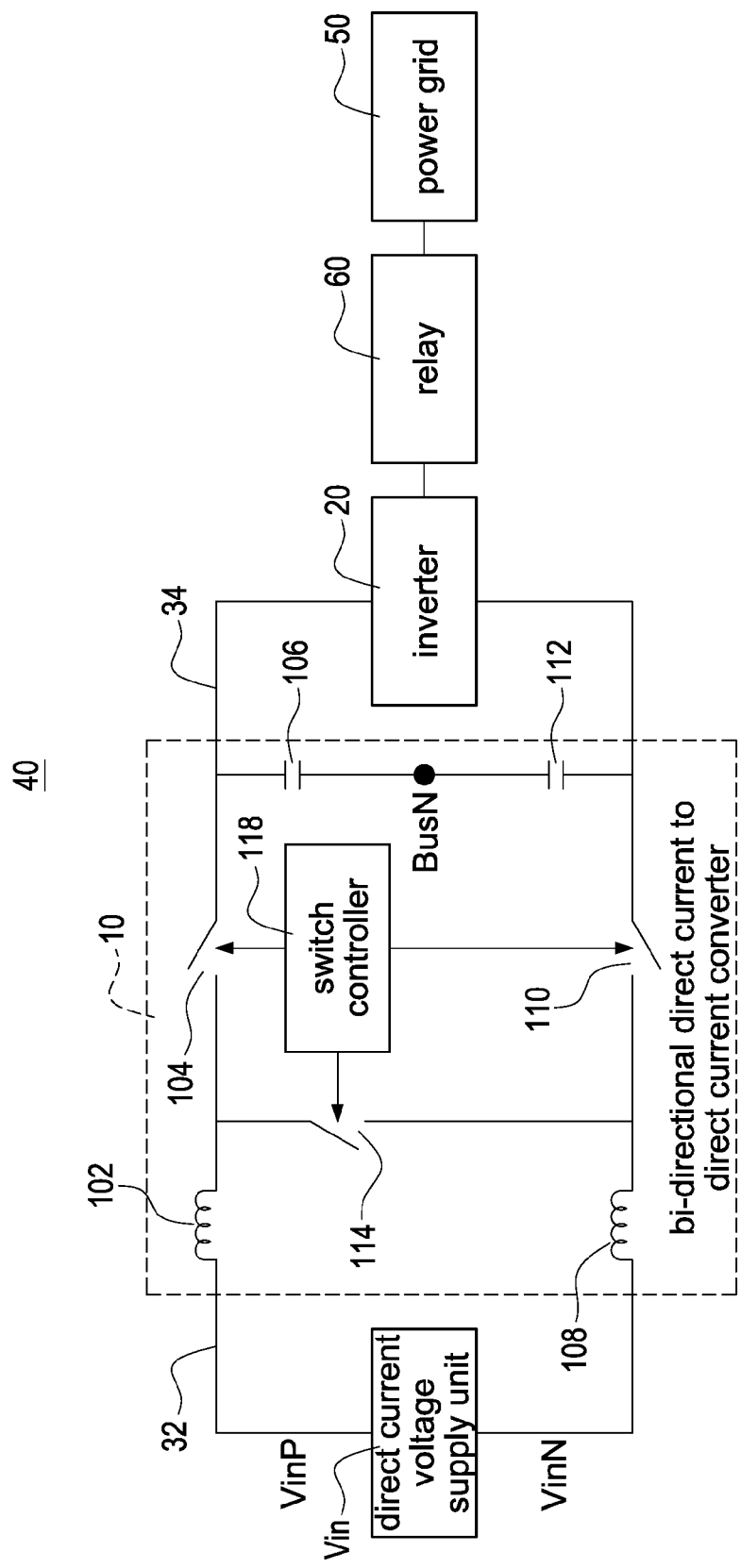
FIG. 6 shows a block diagram of the second embodiment of the grid-connected inverter system of the present invention.

FIG. 6 shows a block diagram of the second embodiment of the grid-connected inverter system of the present invention. A grid-connected inverter system 40 comprises a direct current voltage supply unit Vin, a bi-directional direct current to direct current converter 10, an inverter 20, a power grid 50 and a relay 60. The direct current voltage supply unit Vin comprises a voltage positive side VinP and a voltage negative side VinN. The bi-directional direct current to direct current converter 10 is electrically connected to the direct current voltage supply unit Vin. The inverter 20 is electrically connected to the bi-directional direct current to direct current converter 10. The power grid 50 is electrically connected to the inverter 20. The relay 60 is electrically connected to the inverter 20 and the power grid 50.

The bi-directional direct current to direct current converter 10 includes a first inductor 102, a first switch 104, a first capacitor 106, a middle voltage point BusN, a second inductor 108, a second switch 110, a second capacitor 112, a third switch 114 and a switch controller 118.

One side of the first inductor 102 is electrically connected to the voltage positive side VinP. A first side of the first switch 104 is electrically connected to the other side of the first inductor 102. A second side of the first switch 104 is electrically connected to the inverter 20. One side of the first capacitor 106 is electrically connected to the second side of the first switch 104 and the inverter 20. The middle voltage point BusN is electrically connected to the other side of the first capacitor 106. One side of the second inductor 108 is electrically connected to the voltage negative side VinN. A first side of the second switch 110 is electrically connected to the other side of the second inductor 108. A second side of the second switch 110 is electrically connected to the inverter 20. One side of the second capacitor 112 is electrically connected to the middle voltage point BusN. The other side of the second capacitor 112 is electrically connected to the second side of the second switch 110 and the inverter 20. A first side of the third switch 114 is electrically connected to the other side of the first inductor 102 and the first side of the first switch 104. A second side of the third switch 114 is electrically connected to the other side of the second inductor 108 and the first side of the second switch 110. The switch controller 118 is electrically connected to a third side of the first switch 104, a third side of the second switch 110 and a third side of the third switch 114.

The direct current voltage supply unit Vin provides the bi-directional direct current to direct current converter 10 with an input direct current voltage 32. When the third switch 114 is turned on, and when the first switch 104 is turned off, and when the second switch 110 is turned off, then the first inductor 102 and the second inductor 108 store energy. When the third switch 114 is turned off, and when the first switch 104 is turned on, and when the second switch 110 is turned on, then the first inductor 102 and the second inductor 108 release energy to the first capacitor 106 and the second capacitor 112.

In another word, the switch controller 118 turns on or turns off the first switch 104, the second switch 110 and the third switch 114, so that the bi-directional direct current to direct current converter 10 converts the input direct current voltage 32 into an output direct current voltage 34. The bi-directional direct current to direct current converter 10 sends the output direct current voltage 34 to the inverter 20. Moreover, the bi-directional direct current to direct current converter 10 sends the output direct current voltage 34 to the inverter 20 through the first capacitor 106 and the second capacitor 112.

Figure 1:
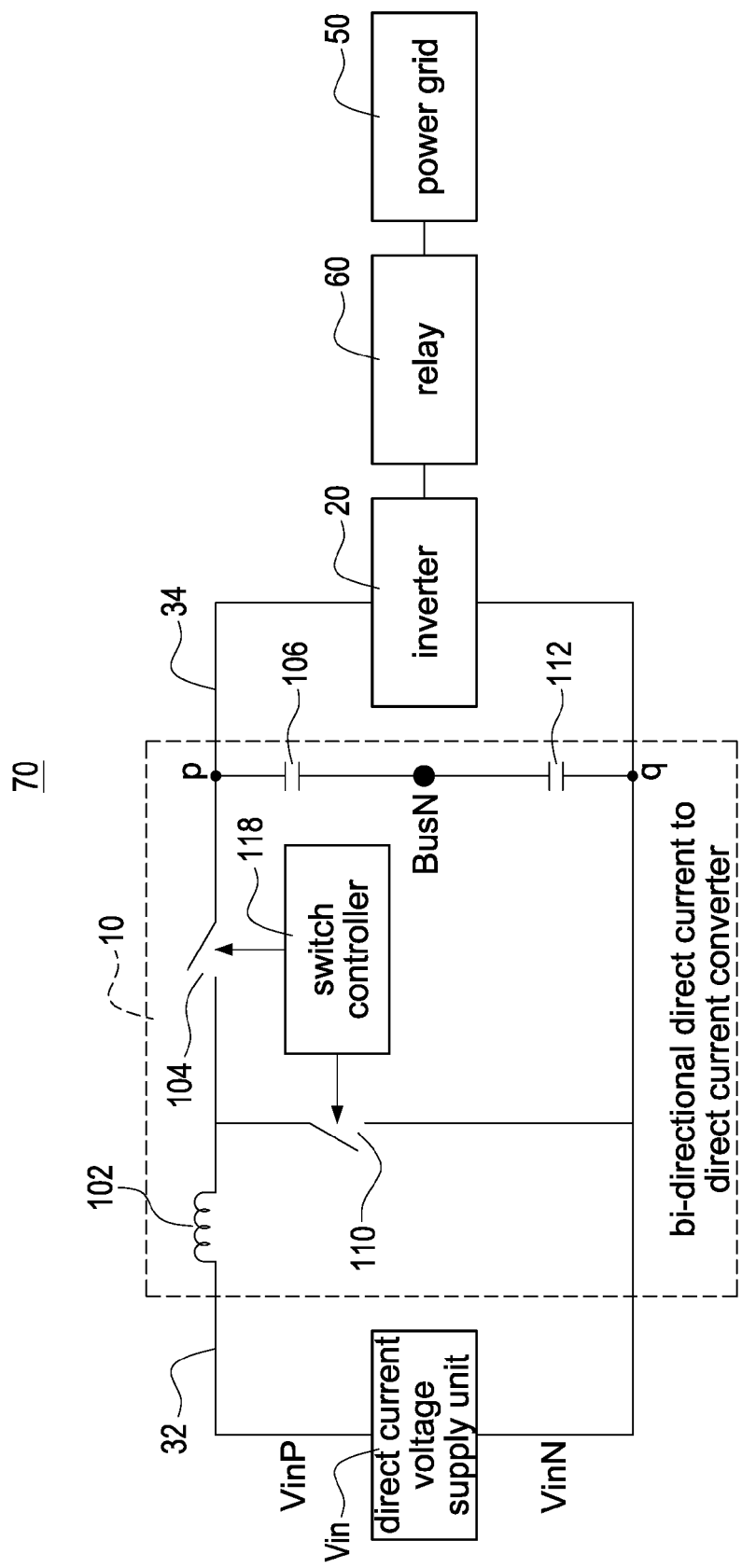
FIG. 1 shows a block diagram of a related art grid-connected inverter system.
Figure 2:
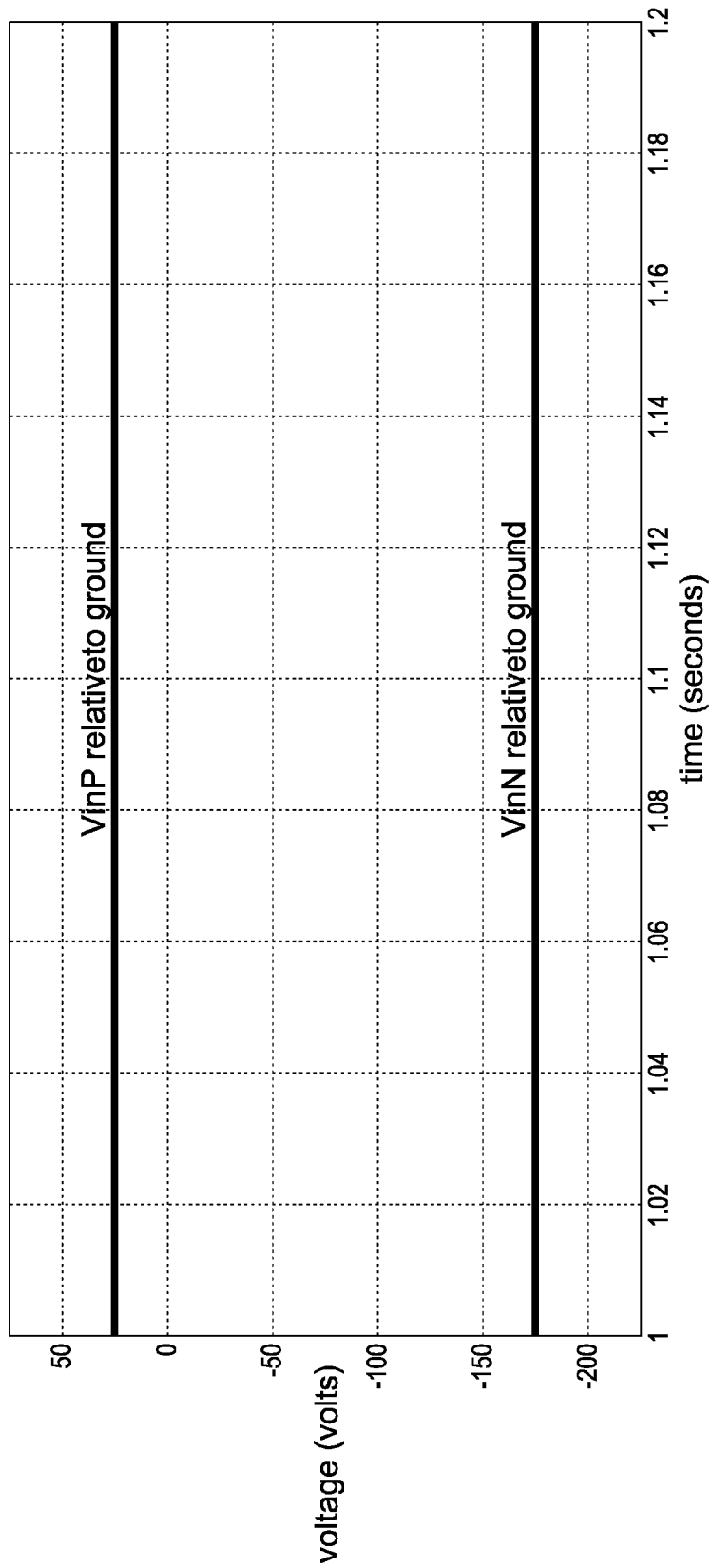
FIG. 2 shows a voltage simulation diagram of the related art grid-connected inverter system.
Figure 7:
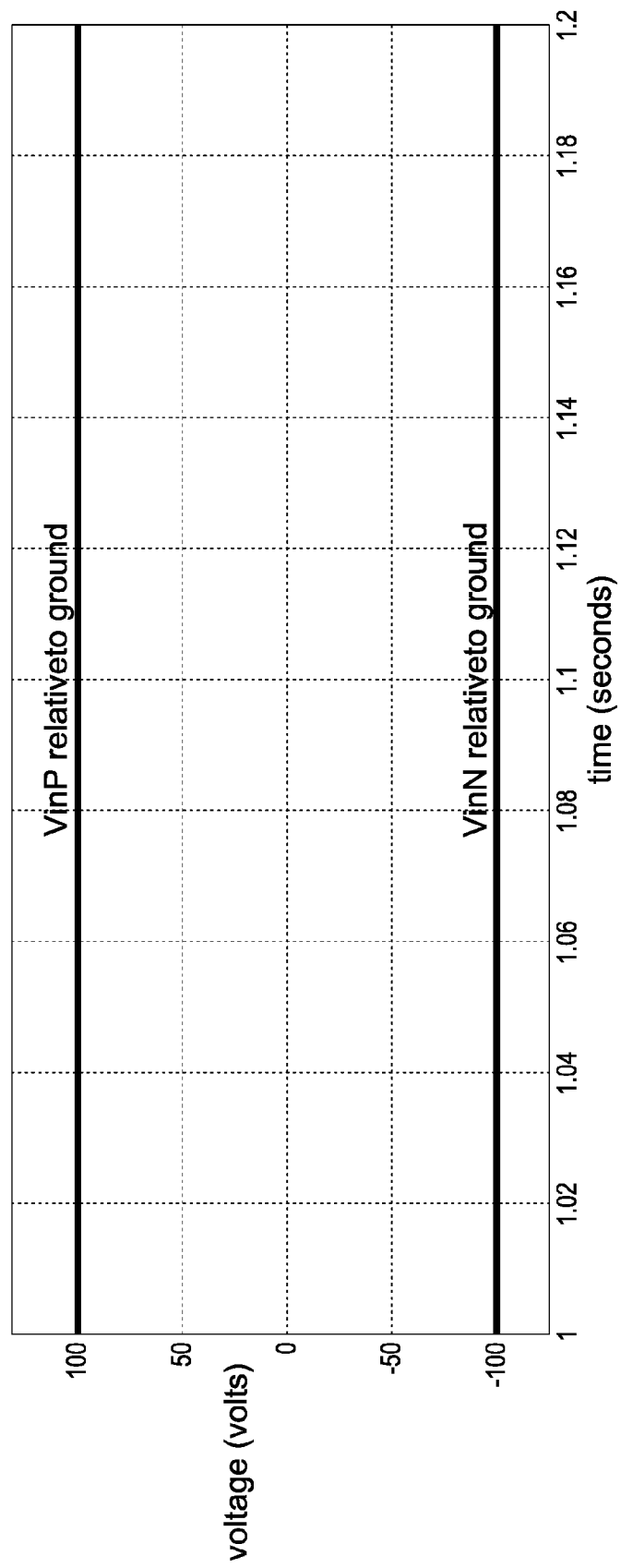
FIG. 7 shows a voltage simulation diagram of the bi-directional direct current to direct current converter or the grid-connected inverter system of the present invention.

FIG. 7 shows a voltage simulation diagram of the bi-directional direct current to direct current converter or the grid-connected inverter system of the present invention. As shown in FIG. 7, the absolute value of the voltage of the voltage positive side VinP relative to ground is equal to the absolute value of the voltage of the voltage negative side VinN relative to ground (namely, 100V, a half of the input direct current voltage 32; because comparing to FIG. 1, the circuit of the present invention is symmetrical; the voltage waveform shown in FIG. 7 is also symmetrical to the zero point). The present invention is in conformity with the laws and regulations of the section 1300 of JEAC8001-2011 of Japan mentioned above.

The advantage of the present invention is to reduce the voltage of the voltage negative side VinN of the direct current voltage supply unit Vin relative to ground. No extra isolation apparatus has to be arranged to be in conformity with the laws and regulations. The voltage relative to ground is not related to the Vbus mentioned in FIG. 1. The requirement can be achieved by the input direct current voltage 32.

Comparing to FIG. 4 (or FIG. 6), FIG. 3 (or FIG. 5) can balance the voltage of the first capacitor 106 and the voltage of the second capacitor 112, so that the voltage of the first capacitor 106 is equal to the voltage of the second capacitor 112. Comparing to FIG. 3 (or FIG. 5), FIG. 4 (or FIG. 6) can save a switch and can still maintain the advantage that the voltage relative to ground is not related to the Vbus.

Figure 8:
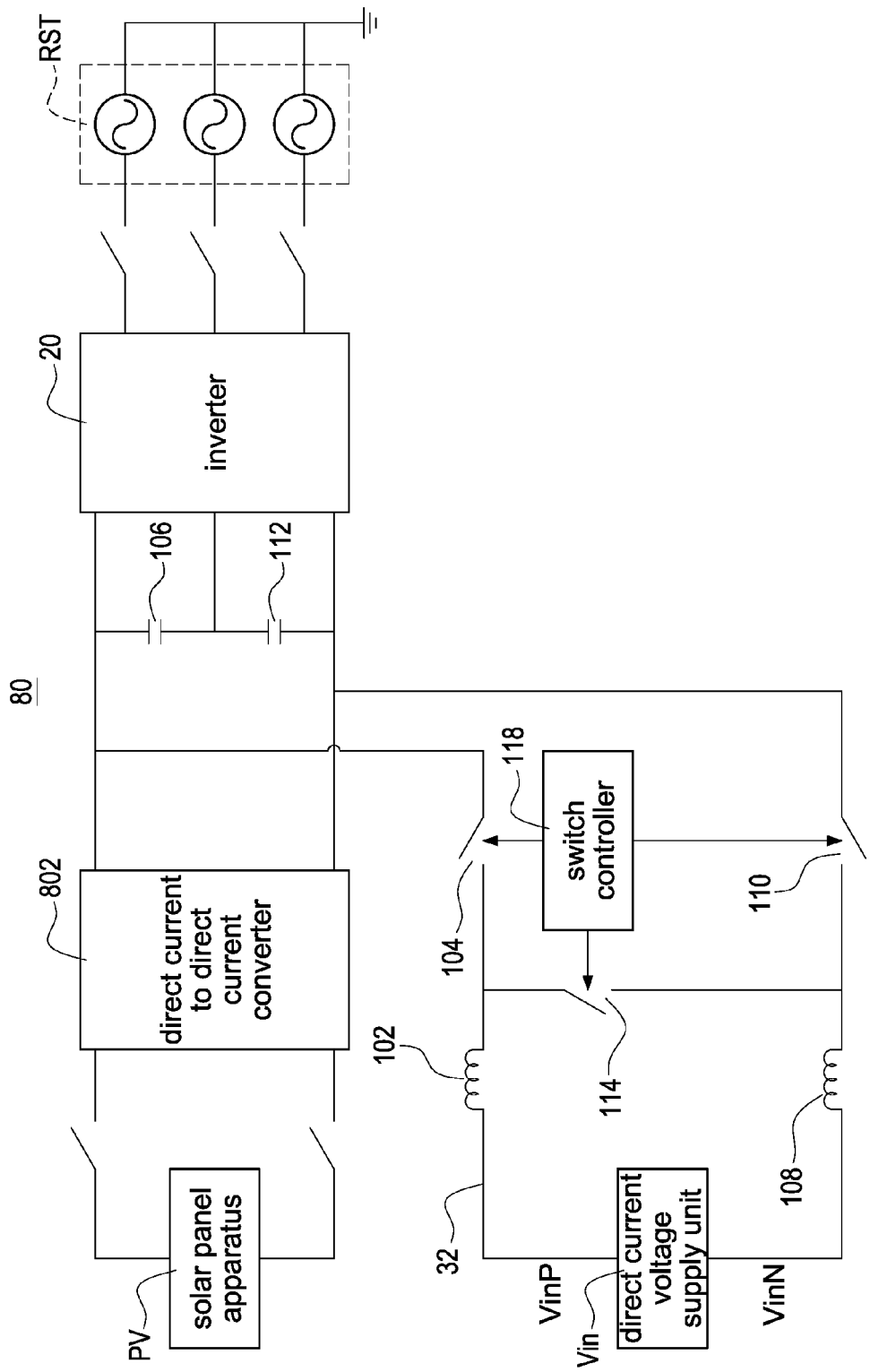
FIG. 8 shows a block diagram of the first embodiment of the bi-directional direct current to direct current converter of the present invention applied to the solar energy grid-connected inverter system.

Moreover, the present invention can be applied to other solar energy grid-connected inverter systems as well. FIG. 8 shows a block diagram of the first embodiment of the bi-directional direct current to direct current converter of the present invention applied to the solar energy grid-connected inverter system. A solar energy grid-connected inverter system 80 at least comprises a solar panel apparatus PV, a direct current to direct current converter 802, an inverter 20, a direct current voltage supply unit Vin, a first inductor 102, a first switch 104, a first capacitor 106, a second inductor 108, a second switch 110, a second capacitor 112, a third switch 114, a switch controller 118 and a three-phase power RST. The direct current voltage supply unit Vin comprises a voltage positive side VinP and a voltage negative side VinN.

Figure 9:
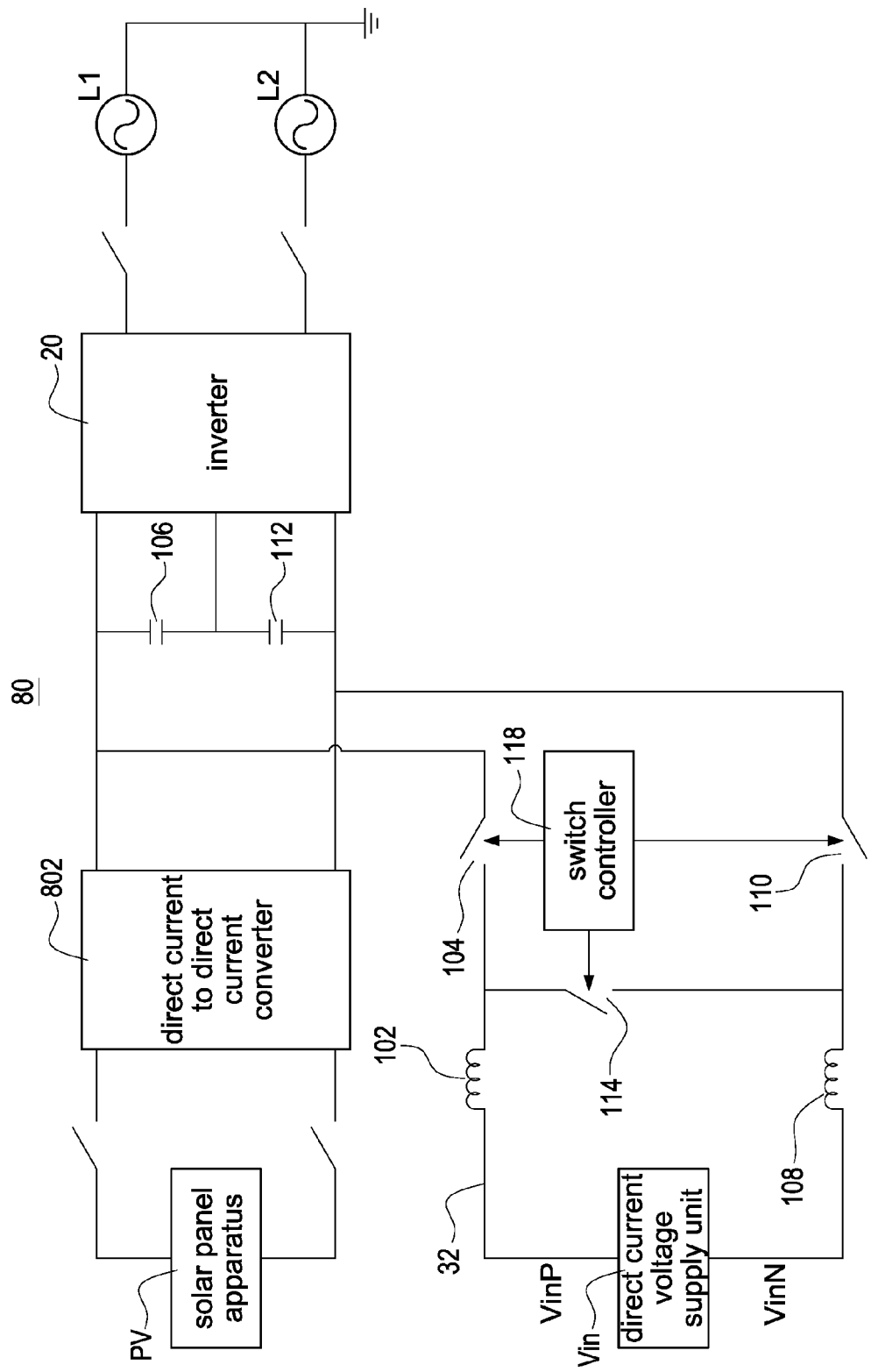
FIG. 9 shows a block diagram of the second embodiment of the bi-directional direct current to direct current converter of the present invention applied to the solar energy grid-connected inverter system.

FIG. 9 shows a block diagram of the second embodiment of the bi-directional direct current to direct current converter of the present invention applied to the solar energy grid-connected inverter system. The description for the elements shown in FIG. 9, which are similar to those shown in FIG. 8, is not repeated here for brevity. Moreover, the solar energy grid-connected inverter system 80 further comprises a first power unit L1 and a second power unit L2 to replace the three-phase power RST.

Figure 10:
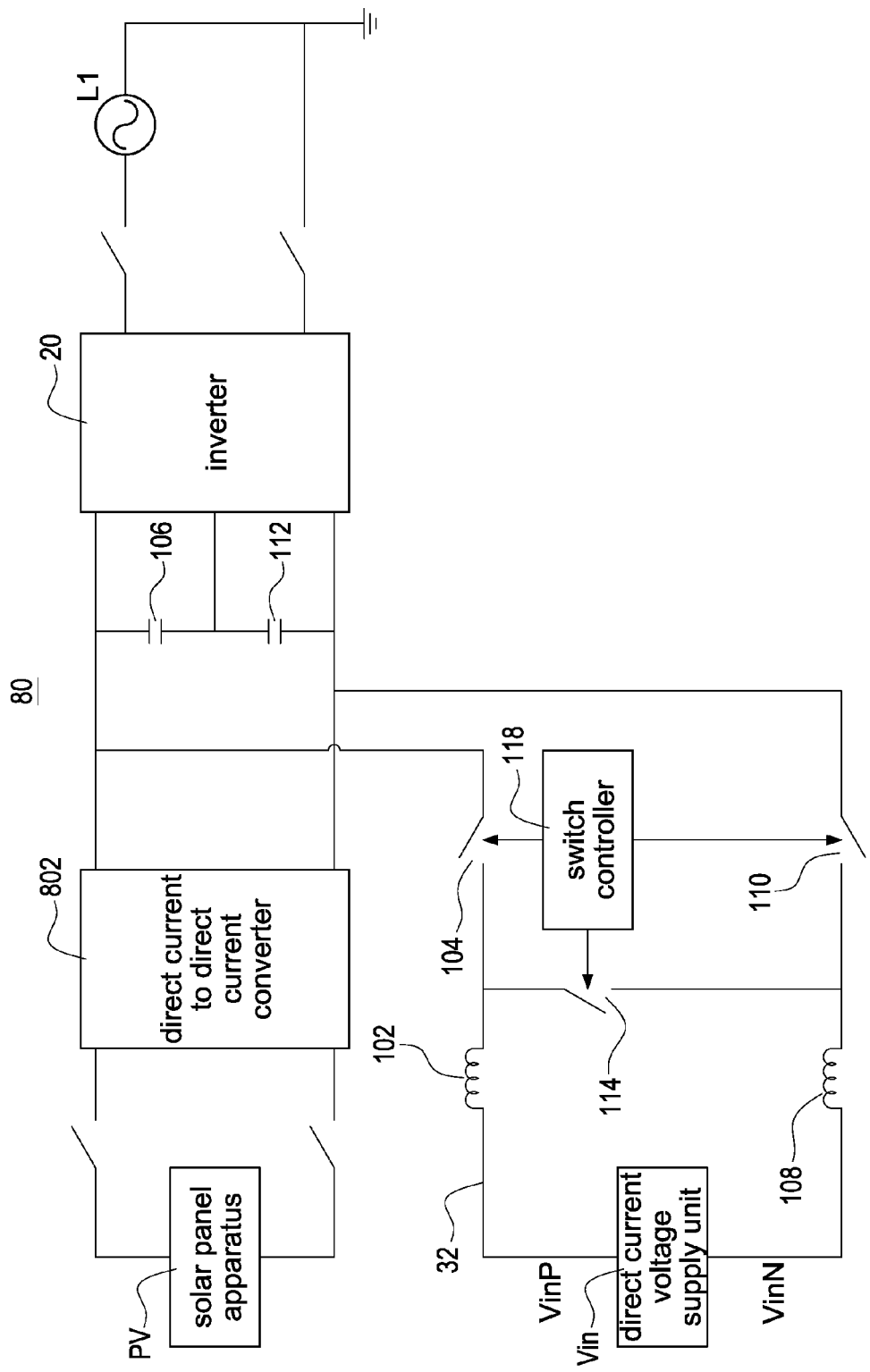
FIG. 10 shows a block diagram of the third embodiment of the bi-directional direct current to direct current converter of the present invention applied to the solar energy grid-connected inverter system.

FIG. 10 shows a block diagram of the third embodiment of the bi-directional direct current to direct current converter of the present invention applied to the solar energy grid-connected inverter system. The description for the elements shown in FIG. 10, which are similar to those shown in FIG. 8, is not repeated here for brevity. Moreover, the solar energy grid-connected inverter system 80 further comprises a first power unit L1 to replace the three-phase power RST.

Figure 11:
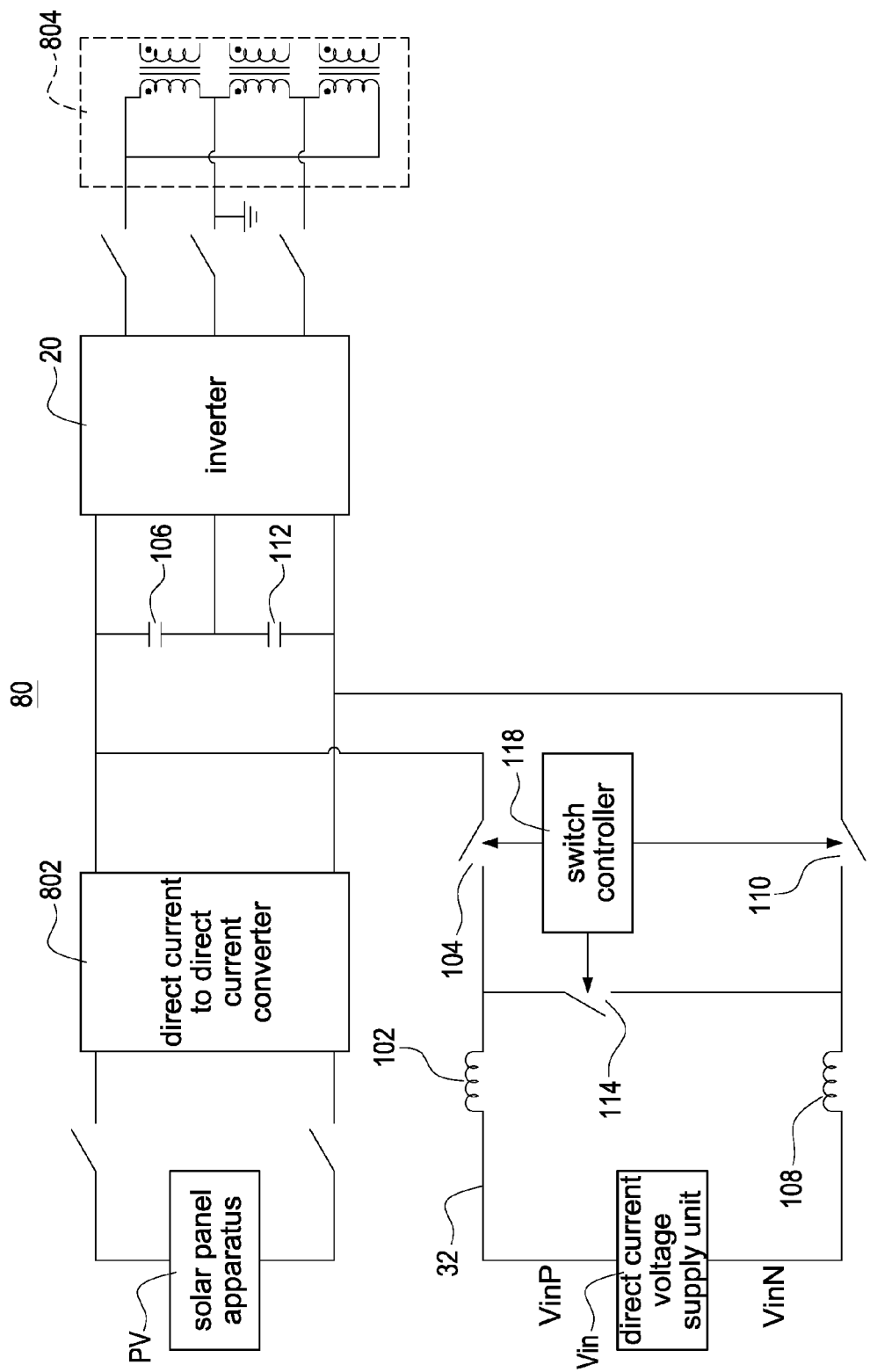
FIG. 11 shows a block diagram of the fourth embodiment of the bi-directional direct current to direct current converter of the present invention applied to the solar energy grid-connected inverter system.

FIG. 11 shows a block diagram of the fourth embodiment of the bi-directional direct current to direct current converter of the present invention applied to the solar energy grid-connected inverter system. The description for the elements shown in FIG. 11, which are similar to those shown in FIG. 8, is not repeated here for brevity. Moreover, the solar energy grid-connected inverter system 80 further comprises a transformer apparatus 804 to be connected to the three-phase power RST (not shown in FIG. 11 but shown in FIG. 8).

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A bi-directional direct current to direct current converter applied to a direct current voltage supply unit and an inverter, the direct current voltage supply unit comprising a voltage positive side and a voltage negative side, the bi-directional direct current to direct current converter comprising:
    an input unit consisting of two voltage input sides connected to the voltage positive side and the voltage negative side;
    a first inductor, one side of the first inductor electrically connected to the voltage positive side;
    a first switch, a first side of the first switch electrically connected to another side of the first inductor, a second side of the first switch electrically connected to the inverter;
    a first capacitor, one side of the first capacitor electrically connected to the second side of the first switch and the inverter;
    a middle voltage point electrically connected to another side of the first capacitor, but not connected to a ground;
    a second inductor, one side of the second inductor electrically connected to the voltage negative side;
    a second switch, a first side of the second switch electrically connected to another side of the second inductor, a second side of the second switch electrically connected to the inverter;
    a second capacitor, one side of the second capacitor electrically connected to the middle voltage point, another side of the second capacitor electrically connected to the second side of the second switch and the inverter;
    a third switch, a first side of the third switch electrically connected to the other side of the first inductor and the first side of the first switch, a second side of the third switch electrically connected to the middle voltage point; and
    a fourth switch, a first side of the fourth switch electrically connected to the middle voltage point, a second side of the fourth switch electrically connected to the other side of the second inductor and the first side of the second switch,
    wherein the direct current voltage supply unit provides the bi-directional direct current to direct current converter with an input direct current voltage through the two voltage input sides; when the third switch is turned on, and when the fourth switch is turned on, and when the first switch is turned off, and when the second switch is turned off, then the first inductor and the second inductor store energy; when the third switch is turned off, and when the fourth switch is turned off, and when the first switch is turned on, and when the second switch is turned on, the first inductor and the second inductor release energy to the first capacitor and the second capacitor, and
    wherein an electric potential of the middle voltage point is controlled to be equal to the ground.

2. The bi-directional direct current to direct current converter in claim 1 further comprising:
    a switch controller electrically connected to a third side of the first switch, a third side of the second switch, a third side of the third switch and a third side of the fourth switch,
    wherein the switch controller turns on or turns off the first switch, the second switch, the third switch and the fourth switch.

3. A bi-directional direct current to direct current converter applied to a direct current voltage supply unit and an inverter, the direct current voltage supply unit comprising a voltage positive side and a voltage negative side, the bi-directional direct current to direct current converter comprising:
    an input unit consisting of two voltage input sides connected to the voltage positive side and the voltage negative side;
    a first inductor, one side of the first inductor electrically connected to the voltage positive side;
    a first switch, a first side of the first switch electrically connected to another side of the first inductor, a second side of the first switch electrically connected to the inverter;
    a first capacitor, one side of the first capacitor electrically connected to the second side of the first switch and the inverter;
    a middle voltage point electrically connected to another side of the first capacitor, but not connected to a ground;
    a second inductor, one side of the second inductor electrically connected to the voltage negative side;
    a second switch, a first side of the second switch electrically connected to another side of the second inductor, a second side of the second switch electrically connected to the inverter;
    a second capacitor, one side of the second capacitor electrically connected to the middle voltage point, another side of the second capacitor electrically connected to the second side of the second switch and the inverter; and a third switch, a first side of the third switch electrically connected to the other side of the first inductor and the first side of the first switch, a second side of the third switch electrically connected to the other side of the second inductor and the first side of the second switch, wherein the direct current voltage supply unit provides the bi-directional direct current to direct current converter with an input direct current voltage through the two voltage input sides; when the third switch is turned on, and when the first switch is turned off, and when the second switch is turned off, then the first inductor and the second inductor store energy; when the third switch is turned off, and when the first switch is turned on, and when the second switch is turned on, then the first inductor and the second inductor release energy to the first capacitor and the second capacitor, and wherein an electric potential of the middle voltage point is controlled to be equal to the ground.

4. The bi-directional direct current to direct current converter in claim 3 further comprising:

a switch controller electrically connected to a third side of the first switch, a third side of the second switch and a third side of the third switch, wherein the switch controller turns on or turns off the first switch, the second switch and the third switch.

5. A grid-connected inverter system comprising:

a direct current voltage supply unit comprising a voltage positive side and a voltage negative side;

a bi-directional direct current to direct current converter electrically connected to the direct current voltage supply unit;

an inverter electrically connected to the bi-directional direct current to direct current converter; and a power grid electrically connected to the inverter, wherein the bi-directional direct current to direct current converter comprises:

an input unit consisting of two voltage input sides connected to the voltage positive side and the voltage negative side;

a first inductor, one side of the first inductor electrically connected to the voltage positive side;

a first switch, a first side of the first switch electrically connected to another side of the first inductor, a second side of the first switch electrically connected to the inverter;

a first capacitor, one side of the first capacitor electrically connected to the second side of the first switch and the inverter;

a middle voltage point electrically connected to another side of the first capacitor, but not connected to a ground;

a second inductor, one side of the second inductor electrically connected to the voltage negative side;

a second switch, a first side of the second switch electrically connected to another side of the second inductor, a second side of the second switch electrically connected to the inverter;

a second capacitor, one side of the second capacitor electrically connected to the middle voltage point, another side of the second capacitor electrically connected to the second side of the second switch and the inverter;

a third switch, a first side of the third switch electrically connected to the other side of the first inductor and the first side of the first switch, a second side of the third switch electrically connected to the middle voltage point; and a fourth switch, a first side of the fourth switch electrically connected to the middle voltage point, a second side of the fourth switch electrically connected to the other side of the second inductor and the first side of the second switch, wherein the direct current voltage supply unit provides the bi-directional direct current to direct current converter with an input direct current voltage through the two voltage input sides; when the third switch is turned on, and when the fourth switch is turned on, and when the first switch is turned off, and when the second switch is turned off, then the first inductor and the second inductor store energy; when the third switch is turned off, and when the fourth switch is turned off, and when the first switch is turned on, and when the second switch is turned on, the first inductor and the second inductor release energy to the first capacitor and the second capacitor, and wherein an electric potential of the middle voltage point is controlled to be equal to the ground.

6. The grid-connected inverter system in claim 5, wherein the bi-directional direct current to direct current converter further comprises:

a switch controller electrically connected to a third side of the first switch, a third side of the second switch, a third side of the third switch and a third side of the fourth switch, wherein the switch controller turns on or turns off the first switch, the second switch, the third switch and the fourth switch.

7. The grid-connected inverter system in claim 6 further comprising:

a relay electrically connected to the inverter and the power grid.

8. A grid-connected inverter system comprising:

a direct current voltage supply unit comprising a voltage positive side and a voltage negative side;

a bi-directional direct current to direct current converter electrically connected to the direct current voltage supply unit;

an inverter electrically connected to the bi-directional direct current to direct current converter; and a power grid electrically connected to the inverter, wherein the bi-directional direct current to direct current converter comprises:

an input unit consisting of two voltage input sides connected to the voltage positive side and the voltage negative side;

a first inductor, one side of the first inductor electrically connected to the voltage positive side;

a first switch, a first side of the first switch electrically connected to another side of the first inductor, a second side of the first switch electrically connected to the inverter;

a first capacitor, one side of the first capacitor electrically connected to the second side of the first switch and the inverter;

a middle voltage point electrically connected to another side of the first capacitor, but not connected to a ground;

a second inductor, one side of the second inductor electrically connected to the voltage negative side;

a second switch, a first side of the second switch electrically connected to another side of the second inductor, a second side of the second switch electrically connected to the inverter;

a second capacitor, one side of the second capacitor electrically connected to the middle voltage point, another side of the second capacitor electrically connected to the second side of the second switch and the inverter; and a third switch, a first side of the third switch electrically connected to the other of the first inductor and the first side of the first switch, a second side of the third switch electrically connected to the other side of the second inductor and the first side of the second switch, wherein the direct current voltage supply unit provides the bi-directional direct current to direct current converter with an input direct current voltage through the two voltage input sides; when the third switch is turned on, and when the first switch is turned off, and when the second switch is turned off, then the first inductor and the second inductor store energy; when the third switch is turned off, and when the first switch is turned on, and when the second switch is turned on, then the first inductor and the second inductor release energy to the first capacitor and the second capacitor, and wherein an electric potential of the middle voltage point is controlled to be equal to the ground.

9. The grid-connected inverter system in claim 8, wherein the bi-directional direct current to direct current converter further comprises:

a switch controller electrically connected to a third side of the first switch, a third side of the second switch and a third side of the third switch, wherein the switch controller turns on or turns off the first switch, the second switch and the third switch.

10. The grid-connected inverter system in claim 9 further comprising:

a relay electrically connected to the inverter and the power grid.

11. A solar energy grid-connected inverter system comprising:

a solar panel apparatus;

a direct-current-to-direct-current converter electrically connected to the solar panel apparatus;

an inverter electrically connected to the direct-current-to-direct-current converter;

a direct current voltage supply unit comprising a voltage positive side and a voltage negative side; and a bi-directional direct current to direct current converter electrically connected to the direct current voltage supply unit, the direct-current-to-direct-current converter and the inverter, wherein the bi-directional direct current to direct current converter comprises:

an input unit consisting of two voltage input sides connected to the voltage positive side and the voltage negative side;

a first inductor electrically connected to the direct current voltage supply unit;

a first switch electrically connected to the first inductor, the direct-current-to-direct-current converter and the inverter;

a first capacitor electrically connected to the direct-current-to-direct-current converter, the inverter and the first switch;

a middle voltage point electrically connected to the first capacitor, but not connected to a ground;

a second inductor electrically connected to the direct current voltage supply unit;

a second switch electrically connected to the second inductor, the direct-current-to-direct-current converter and the inverter;

a second capacitor electrically connected to the direct-current-to-direct-current converter, the inverter, the second switch and the first capacitor; and a third switch electrically connected to the first inductor, the first switch, the second inductor and the second switch, wherein the direct current voltage supply unit is configured to supply an input direct current voltage to the bi-directional direct current to direct current converter through the two voltage input sides, the first inductor and the second inductor store energy if the third switch is turned on, the first switch is turned off, and the second switch is turned off, the first inductor and the second inductor release energy to the first capacitor and the second capacitor if the third switch is turned off, the first switch is turned on, and the second switch is turned on, and wherein an electric potential of the middle voltage point is controlled to be equal to the ground.

12. The solar energy grid-connected inverter system in claim 11, further comprising:

a switch controller electrically connected to the first switch, the second switch, the third switch, the direct-current-to-direct-current converter, the inverter, the first capacitor and the second capacitor, wherein the switch controller is configured to selectively turn on or turn off the first switch, the second switch and the third switch.

13. The solar energy grid-connected inverter system in claim 12, further comprising:

a three-phase power electrically connected to the inverter.

* * * * *